United States Patent
Suzuki et al.

(10) Patent No.: US 6,437,764 B1
(45) Date of Patent: Aug. 20, 2002

(54) LIQUID CRYSTAL DISPLAY DEVICE

(75) Inventors: Nobuyuki Suzuki, Mobara; Toshifumi Ozaki, Koganei; Yasuyuki Mishima; Masahiro Ishii, both of Mobara, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/342,133

(22) Filed: Jun. 29, 1999

(30) Foreign Application Priority Data

Jun. 29, 1998 (JP) .......................................... 10-183022

(51) Int. Cl.[7] ................................................ G09G 3/36
(52) U.S. Cl. ............................ 345/87; 345/88; 345/89; 349/5; 349/38; 349/123; 349/124; 349/139; 349/141
(58) Field of Search .............................. 345/87, 88, 89; 349/5, 38, 123, 124, 141, 139

(56) References Cited

U.S. PATENT DOCUMENTS

| 5,592,199 | A | * | 1/1997 | Kawaguchi et al. | ........ 345/206 |
|---|---|---|---|---|---|
| 5,610,414 | A | * | 3/1997 | Yoneda et al. | ................. 257/99 |
| 5,956,001 | A | * | 9/1999 | Sumida et al. | ................. 345/55 |
| 6,081,305 | A | * | 6/2000 | Sato et al. | ...................... 349/5 |
| 6,100,947 | A | * | 8/2000 | Katayama | ..................... 349/38 |

* cited by examiner

*Primary Examiner*—Richard Hjerpe
*Assistant Examiner*—Jean Lesperance
(74) *Attorney, Agent, or Firm*—Antonelli, Terry, Stout & Kraus, LLP

(57) ABSTRACT

In a liquid crystal display device having a pair of substrates disposed to oppose one another and a liquid crystal layer sealed therebetween, an image signal driver circuit element disposed on a surface of one of the pair of substrates confronting the liquid crystal layer, and a plurality of wiring layers formed on the surface so as to connect the image signal driver circuit element electrically to external circuitry at least two of the plurality of the wiring layers belongs to a first group and are connected to input electrodes of the image signal driver circuit element for receiving logic signals, at least two of the plurality of the wiring layers other than those of the first group belongs to a second group and are connected to input electrodes of the image signal driver circuit element, other than those for receiving logic signals, which are electrically connected to a voltage supply, and at least one of the wiring layers belonging to the first group and the wiring layers belonging to the second group have substantially similar electric resistance to each other in the group thereof. According to the arrangement, the liquid crystal display device enables a stable operation of the image signal drive circuitry thereof.

9 Claims, 4 Drawing Sheets

LIQUID CRYSTAL DISPLAY DEVICE

BACKGROUND OF THE INVENTION

The present invention relates to liquid crystal display devices and, for example, to a liquid crystal display device of the so called chiponglass (COG) type.

Liquid crystal display devices have a pair of transparent substrates spatially stacked so as to oppose each other with a layer of liquid crystals being sealed therebetween, so as to have multiple pixels (picture elements) formed in the expansion direction of such liquid crystals. Each pixel independently controls the optical transmissivity of light passing there through with respect to an electric field applied to the liquid crystal (LC) material thereof For this purpose, electrodes for generating electric fields in the respective pixels and image signal lines for supplying an image signal to the electrodes are formed on a surface of one of the transparent substrates which confronts the liquid crystal material.

Typically, an image signal is supplied from an image signal drive circuit which is composed of a semiconductor integrated circuit (IC) chip for the image signal line, and the semiconductor integrated circuit is mounted on a region of the one of the transparent substrates other than the display area thereof. Since the image signal is applied to one of a source electrode and a drain electrode of a thin film transistor in the pixel in order to generate an electric field in the pixel, the image signal is called a drain signal or a video signal, the image signal line is called a drain signal line or a video signal line, and the image signal driver circuit is called a drain signal driver circuit or a video signal driver circuit. In this case, logic signals, reference voltages (reference voltage signals), and electric power are supplied from a controller circuit board disposed in the vicinity of one of the peripheral sides of the transparent substrate to the image signal drive circuit through a flexible printed circuit board having a wiring pattern. Therefore, wiring layers connected both to input electrodes of the image signal drive circuit and to output terminals of the flexible printed circuit board are formed on the aforementioned transparent substrate.

As the screen size of the liquid crystal display device having the aforementioned structure becomes larger, the density of the aforementioned wiring layers connected to the image signal drive circuit becomes higher, and thus some disadvantages in the liquid crystal display device caused thereby have arisen.

Since the input side of the image signal drive circuit is high in impedance, the electrical resistivity of the respective wiring lines may be up to a certain value, but should be substantially uniform for each of the wiring lines. This is based on the fact that a deviation in signal waveform delay arises among a plurality of the wiring lines when the resistivity is not uniform, which makes the image signal drive circuit unstable in operation.

A power supply input section is disposed on the input side of the image signal drive circuit, and the electrical resistance of the wiring layer therebetween should be reduced to less than a certain amount to avoid a significant reduction of the operating voltage of the image signal drive circuit. In this case, it may be desirable to balance the resistance values of the wiring layers, other than the wiring layer between the power supply input section and the image signal drive circuit, with the resistance of the wiring layer therebetween, but this can hardly be applied to wiring layers arranged in high density.

SUMMARY OF THE INVENTION

The present invention has been made in view of the technical background mentioned above, and an object of the invention is to provide a liquid crystal display device with image signal drive circuitry which exhibits an enhanced operation stability.

Some representative aspects of the invention as disclosed and claimed herein will be briefly summarized as follows.

In a liquid crystal display device, there is provided a pair of substrates disposed to oppose one another, a liquid crystal layer sealed between the pair of substrates, an image signal driver circuit disposed on a surface of one of the pair of substrates which confronts the liquid crystal layer, and a plurality of wiring layers formed on the surface of one of the pair of substrates so as to connect the image signal driver circuit electrically to external circuitry, at least two of the plurality of wiring layers being provided as a first group used for a connection to input electrodes of the image signal driver circuit for receiving logic signals. At least two of the plurality of the wiring layers other than those of the first group are provided as a second group used for a connection to input electrodes of the image signal driver circuit other than those for receiving logic signals. Thus, the input electrodes related to the second group are electrically connected to a voltage supply. Moreover, at least one of the groups of wiring layers belonging to the first group and belonging to the second group are substantially similar to each other in the group thereof.

The liquid crystal display device thus arranged maintains the resistance values of the wiring layers connected to the logic signal input electrodes in a designated range even if the resistivity values thereof are increased, or keeps the resistance values of the wiring layer connected to the reference power supply electrodes in a designated range even if the resistivity values thereof are increased. Both of the wiring layers are conductive films or stripes formed on the substrate on which the image signal drive circuit (IC) chip is mounted. The wiring layer is formed of a material such as a metal, an alloy, an impurity doped semiconductor, or the like.

Keeping the resistance values among the wiring layers connected to the logic input electrodes in a designated range so that the resistance values are similar to each other preferably ensures that a deviation will no longer take place in the delay of the signal waveforms, and thereby enhances the operation stability of the image signal drive circuitry.

On the other hand, keeping the resistance values among the wiring layers connected to the reference power supply electrodes in a designated range so that the resistance values are similar to each other also preferably reduces any deviation in voltage potential drop of the reference power supply.

By adjusting nothing but the electrical resistance of the aforementioned wiring layers of concern, at least one of the advantages mentioned above can be obtained even if the wiring layers are arranged densely on the substrate.

In the aforementioned liquid crystal display device, certain numbers of the input electrodes of the image signal driver circuit are divided for the logic signal input electrodes and the reference voltage supply electrodes, respectively, the input electrodes used as logic signal input electrodes being disposed adjacent to each other, and the input electrodes used as reference voltage supply electrodes being disposed adjacent to each other.

In this liquid crystal display device, the wiring layers connected to the logic input electrodes are arranged in proximity to one another, and the wiring layers connected to the reference power supply electrodes are arranged in proximity to one another, respectively. Therefore, the wiring design and the arrangement of the wiring layer for unifying substantially the electrical resistance of the wiring layer of concern are simplified.

Based on the several reasons mentioned above, it is recommended that in a liquid crystal display device having a pair of substrates disposed so as to confront one another, a liquid crystal layer being sealed between the pair of substrates, and an image signal driver circuit element disposed on a main surface of one of the pair of substrates and a plurality of input terminals arranged along an edge of the one of the pair of substrates close to the image signal driver circuit element, the plurality of input terminals are divided into groups relative to the functions thereof and are arranged with respect to the groups.

These and other objects, features and advantages of the present invention will become more apparent from the following description when taken in conjunction with the accompanying drawings.

DETAILED DESCRIPTION

Preferred embodiments of the liquid crystal display device of the present invention will be explained with reference to the accompanying drawings.

<Overall Configuration>

Figure 2:
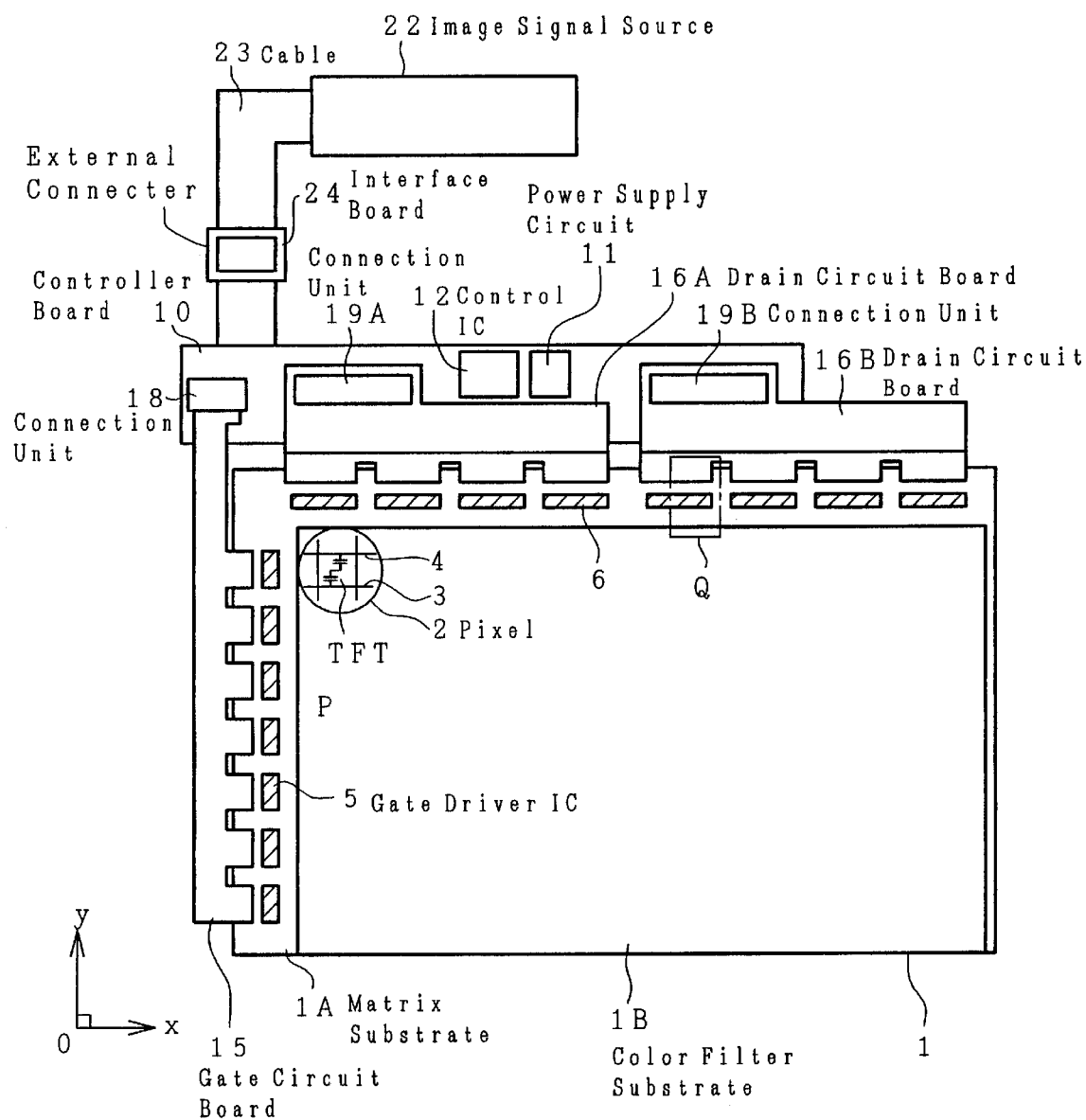
FIG. 2 is a schematic diagram showing the overall configuration of the liquid crystal display device according to the present invention.

FIG. 2 is a schematic diagram illustrating an example of the overall configuration of a liquid crystal display device embodying the present invention. In this embodiment, the present invention is applied to one of the liquid crystal display devices employing the so-called lateral electric field scheme, which is known for its ability to achieve wide viewing angles.

As shown in FIG. 2, a liquid crystal display panel 1 is fabricated by superposing a pair of transparent substrates 1A, 1B so as to oppose each other. In this case, one of these transparent substrates (the lower side substrate 1A in FIG. 2, called the matrix substrate) is formed to be slightly larger in size than the other one of the transparent substrates (the upper side substrate 1B in FIG. 2, called the color filter substrate), wherein two peripheral edges of the substrates are aligned so as to be almost flush with each other at the lower side and the right side, as seen in FIG. 2. Therefore, the left and upper peripheries of the one transparent substrate 1A are extended outwardly with respect to the other transparent substrates 1B. As will be described in detail later, these portions define a region for use in mounting gate drive circuitry and drain drive circuitry.

The upper and lower transparent substrates 1A, 1B overlap each other in the central rectangular area in which pixels 2 are formed in a two dimensionally (matrix) arrayed manner. The pixel 2 is formed in a region surrounded by scan signal (transmission) lines 3 extending in an direction and being juxtaposed in a y-direction, as seen in FIG. 2, and image signal (transmission) lines 4 extending in the y-direction and being juxtaposed in the x direction. Each pixel 2 comprises a switching element TFT driven by a scan signal supplied from one of the scan signal lines 3, and a pixel electrode to which an image signal is supplied from one of the image signal lines 4 through the switching element TFT.

Here, each of the pixels 2 employs the so-called lateral electricfield scheme, as described previously, and comprises a reference electrode (i.e. the counter electrode), an additional capacitive element, other than the switching element TFT, and the pixel electrode, which will be described in detail later. Each of the scan signal lines 3 has an end thereof (the left side end in FIG. 2) that is extended to the outside of the transparent substrate 1B for connection with an output terminal of a gate driver integrated circuit (IC) chip 5 mounted on the transparent substrate 1A.

In this embodiment, a plurality of gate driver ICs 5 are provided, while the scan signal lines 3 adjacent to each other are gathered into groups relative to the gate driver ICs. The scan signal lines 3 in each of the groups are connected to one of the gate driver ICs 5 in the vicinity of the group corresponding thereto, respectively. Similarly, each of the image signal lines 4 has an end thereof (upper side end in FIG. 2) which is extended to the outside of the transparent substrate 1B for connection with an output terminal of a drain driver IC 6 mounted on the transparent substrate 1A.

In this embodiment, a plurality of drain driver ICs 6 are provided while the image signal lines 4 disposed adjacent to each other are gathered into groups relative to the drain driver ICs. The image signal lines 4 in each of the groups are connected to one of the drain driver ICs 6 in the vicinity of the group corresponding thereto, respectively.

On the other hand, there is a printed circuit board (controller board) 16 that is disposed adjacent to the liquid crystal display panel 1 with the gate driver ICs 5 and drain driver ICs 6 mounted thereon, and on which a control circuit 12 for supplying input signals to the gate driver ICs and the drain driver ICs 6 is mounted, in addition to a power supply circuit 11 or the like. This controller circuit 12 supplies signals to the gate driver ICs 5 and drain driver ICs 6 through respective flexible printed circuit boards (a gate circuit board 15 and drain circuit boards 16A, 16B.

More specifically, the flexible printed circuit board (gate circuit board 15) is disposed on the side of the matrix substrate 1A where the gate driver ICs 5 are mounted, and signal terminals of the gate circuit board 15 are connected to input terminals of the gate driver ICs 5 opposite thereto, respectively. The gate circuit board 15 has a portion thereof which is formed so as to extend toward the side of the controller board 10, and connects to the controller board 10 via a connection unit 18 at the extension portion thereof.

An output signal from the control circuit 12 mounted on the controller board is transmitted through a wiring layer on the controller board 10, the connection unit 18, and a wiring layer on the gate circuit board 16, and then the output signal is input to the respective gate driver circuit 5.

In addition, the drain circuit boards 16A, 16B are disposed on the side of the matrix substrate 1A where the drain driver ICs 6 are mounted, and terminals of the drain circuit boards are connected to input terminals of the drain driver ICs 6 opposed thereto, respectively. Each of the drain circuit boards 16A, 16B has a portion thereof formed so as to extend to the side of the controller board 10, and connects to the controller board 10 via a connection unit 19A or 19B at the extension portion thereof.

An output-signal from the control circuit 12 mounted on the controller board 10 is transmitted through a wiring layer on the controller board 10, the connection unit 19A or 19B, and a wiring layer on the gate circuit board 16A or 16B, and then this output signal is input to the respective drain driver circuit 6. It should be noted that the drain circuit boards 16A, 16B on a side of the drain driver ICs 6 are separated into two components, as shown in FIG. 2. This board separation prevents problems caused by e.g. thermal expansion in accordance with increases in the length of the drain circuit boards in the x-direction of FIG. 2 as the screen size of the liquid crystal display panel 1 increases.

Outputs of the control circuit 12 on the controller board 10 are input to the drain driver ICs 6 corresponding thereto via the connection unit 19A of the drain circuit board 16A and via the connection unit 19B of the drain circuit board 16B. Furthermore, the controller board 10 is arranged so that an image signal is supplied from an image signal source 22 to the control board by a cable 23 through an interface board 24, serving as an external connector, and is then input to the control circuit 12 mounted on the controller board 10.

The liquid crystal display panel 1, the gate circuit board 15, the drain circuit boards 16A, 16B, and the controller board 10 are depicted as if they are located on substantially the same plane in FIG. 2, however, in actual practice practically, the gate circuit board 15 and the drain circuit boards 16A, 16B are bent so that the controller board 10 is placed at substantially right angles to the liquid crystal display panel 1. This configuration has the purpose of reducing an area called the architrave. The term "architrave" used herein denotes a marginal region lying between a contour of an outer frame of the liquid crystal display devices and the contour of a display region (i.e. a screen) thereof Any shrinkage of the marginal region can obtain effects of enlarging the display region in contrast to the outer frame.

<Pixel Structure>

Figure 3:
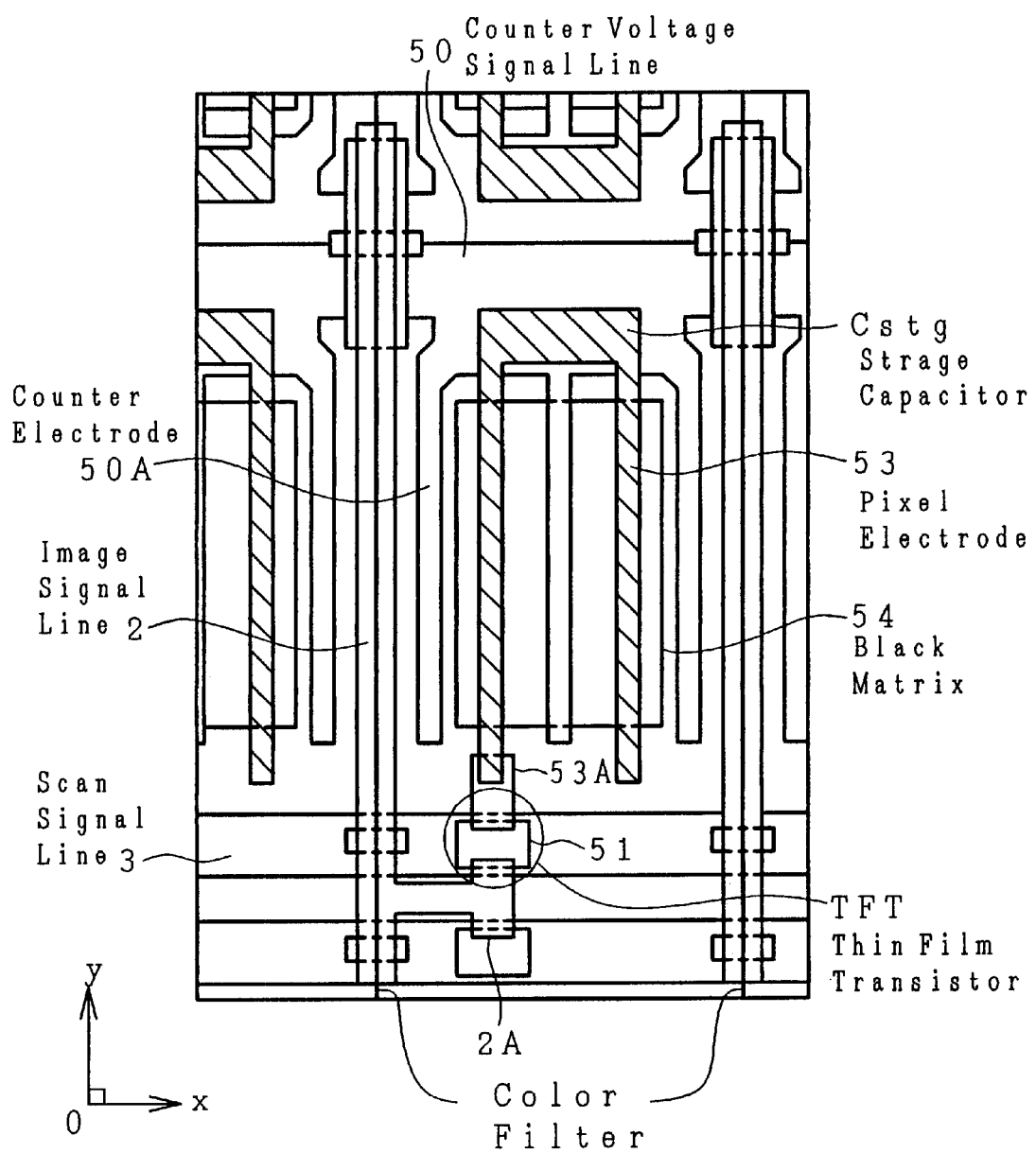
FIG. 3 is a plan view illustrating the planar configuration of one of the pixel regions of the liquid crystal display device.

FIG. 3 shows a plan view depicting a detailed structure of the above-mentioned pixel region. As shown in FIG. 3, the scan signal lines 3 and the counter voltage signal lines 50 are formed on a main surface of the matrix substrate 1A. An area surrounded by the respective signal lines 3, 50 and the image signal lines 2 extending in the y-direction forms the a pixel region.

More specifically, in this embodiment, a counter voltage signal line 50 is formed along and between a pair of the scan signal lines 3 disposed adjacent to one another, wherein pixel regions are formed in both of the ±y directions from the counter voltage signal line 50 as a boundary.

With such an arrangement, the counter voltage signal lines 50 being juxtaposed in the y-direction can be reduced in number down at about half of that in the prior art, therefore, it becomes possible to use a region enclosed thereby in the prior art as part of the pixel regions, and consequentially the net the area of pixel regions becomes wider.

In each pixel region, a predetermined number of—three, for example—counter electrodes 50A are integrated with the counter voltage signal line 50 and extended therefrom in the y-direction at equal intervals. These respective counter electrodes 50A extend in proximity to the scan signal line 3 without being connected thereto. Two of the counter electrodes 50A at both sides of the pixel region are disposed adjacent to respective image signal lines 2, and the remaining one of them is disposed at the center of the pixel region.

Furthermore, an insulating film (e.g. of silicon nitride) is formed on the principal surface of the transparent substrate 1A on which the scan signal lines 3, the counter voltage signal lines 50, and the counter electrodes 50A are formed in the above-mentioned manner, and the insulating film covers the scan signal lines 3 also. The insulating film functions as an interlayer insulating film for isolating the image signal lines 2 from the scan signal lines 3 and counter voltage signal lines 50, as a gate insulating film with respect to the thin-film transistors TFT, and as a dielectric film for storage capacitors Cstg.

On a surface of the insulating film, a semiconductor layer 51 is formed at first in the region thereof where the TFT will be formed. The semiconductor layer 51 is made of amorphous silicon (Si), for example, and is formed over a part of the scan signal line 3 adjacent to the image signal line 2. This structure allows a part of the scan signal line 3 to function as the gate electrode of thin film transistor TFT also. The image signal lines 2, extending in the y-direction and being juxtaposed along the x-direction, are also formed on the insulating film. The image signal line 2 is integrated with a drain electrode 2A extending up to a part of the surface of the semiconductor layer 51 constituting the thin-film transistor TFT.

Furthermore, a pixel electrode 53, which is connected to a source electrode 53A of the thin film transistor TFT, is formed on the surface of the insulating film in the pixel region. The pixel electrode 53 is formed to extend in the y-direction so as to pass through the center between the respective counter electrodes 50A. More specifically, one end of the pixel electrode 53 functions also as the source electrode 53A of the thin-film transistor TFT, and the pixel electrode 53 extends from the end thereof in the y-direction, then in the x-direction over the counter voltage signal line 50, and finally in the y-direction as it defines a "U" -like planar shape as a whole.

A part of the pixel electrode 53 overlying the counter voltage signal line 50 forms a storage capacitor Cstg between it and the counter voltage signal line 50 using the aforementioned insulating film as a dielectric film thereof. The storage capacitor Cstg achieves an effect of storing image information at the pixel electrode 53 for a long time while the thin-film transistor TFT turns off, for example.

A surface region of the semiconductor layer 51 having interfaces with the drain electrode 2A and the source electrode 53A of the thin-film transistor TFT is formed as a high concentration layer by doping an impurity, such as phosphorus (P), thereto so that the surface region obtains ohmic contacts with the respective electrodes mentioned above. In this case, the surface region is processed by the steps of forming the high concentration layer in a upper surface of the semiconductor layer 51 entirely, forming the respective electrodes mentioned above, and then removing a part of the high concentration layer other than that in a region where the aforementioned electrodes are formed by an etching treatment using the electrodes as a mask.

The upper surface of the insulating film having the thin-film transistor TFT, the image signal lines 2, the pixel electrode 53, and the storage capacitor Cstg formed thereon is coated with a protective film (e.g. made of silicon nitride), then an alignment film is formed on an upper surface of the insulating film, and thus the so-called lower-side substrate of the liquid crystal display panel 1 is finished.

Although not specifically shown in FIG. 3, a black matrix having an opening at a portion corresponding to each pixel region is formed at part of the liquid crystal side of the transparent substrate (the aforementioned color filter substrate) 1B, called the upper-side substrate. The opening of the black matrix is shown as an area enclosed by a rectangular frame denoted by reference numeral 54 in FIG. 3.

Further, a color filter is formed so as to cover the opening of the black matrix 54 corresponding to the pixel region. A plurality of color filters are juxtaposed in the x direction with respect to the pixel regions. One of the color filters has a different color from those of the other two of the color filters corresponding to the other two pixel regions adjacent to the pixel region corresponding thereto, and has a boundary on the black matrix 54, as shown by a line extending along the y-direction overlying the image signal line 2.

In addition, a leveling layer (film) of a resin material or the like is formed on the surface on which the black matrix and the color filter have been formed, as described above, and then an alignment film is formed on a surface of the leveling layer.

<Arrangement near Drain Driver ICs>

Figure 4:
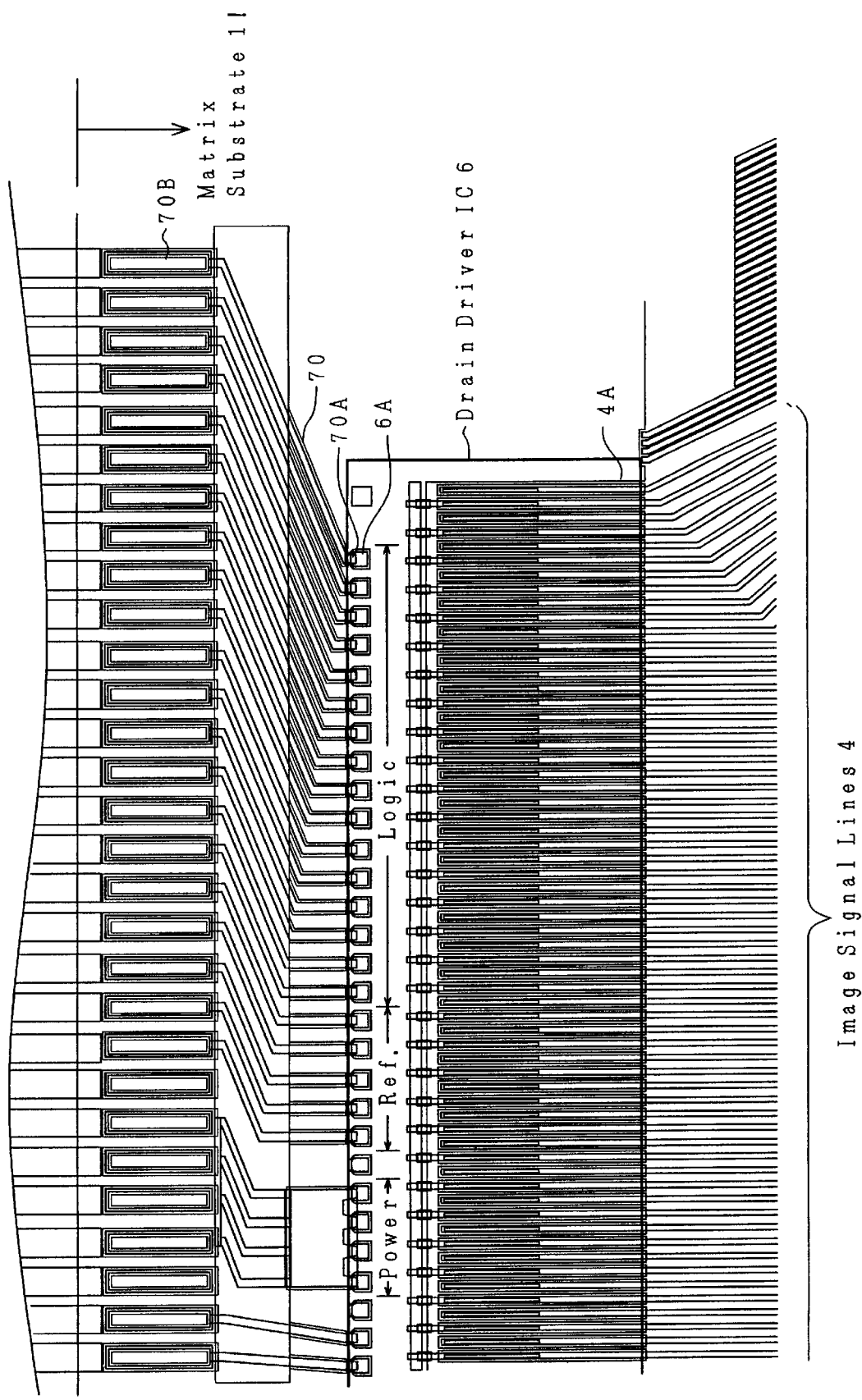
FIG. 4 is a plan view showing one practical example of the wiring pattern around the drain driver circuitry formed on the matrix substrate of the liquid crystal display device according to the present invention.

FIG. 4 is a plan view showing details of one drain driver IC 6 and its vicinity, and depicting a part Q of the matrix substrate 1A enclosed by a dot-dash line in FIG. 2. The drain drivers IC 6 and respective vicinities thereof other than the part Q have similar arrangements to the part Q.

In FIG. 4, image signal lines 4 formed on the matrix substrate 1A are extended to the periphery thereof where signal supply terminals 4A are formed at respective locations thereon opposing respective output electrodes of the drain driver IC 6.

It is evident from viewing FIG. 4 that less output electrodes of the drain driver IC 6 are provided in an interval, thereof than the number of image signal lines 4. Therefore, the respective image signal lines 4 are patterned so as to converge (come closer to one another) as they extend towards the drain driver IC 6 for connection thereto.

On the other hand, the matrix substrate 1A has on a surface thereof "conductive terminals 70A" formed at respective positions opposed to input electrodes 6A of the drain driver IC 6, "wiring layers 70" for connecting to the respective terminals 70A and extending up to the vicinity of the peripheral edge of the matrix substrate 1A, and "signal supply terminals 70B" formed at the extension ends of the wiring layers 70.

The signal supply terminals 70B are conductive pads for connection to the drain circuit board 16. As apparent from FIG. 4, the interval of the signal supply terminals 70B is greater than the interval of the input electrodes 6A of the drain driver IC 6. Therefore, the wiring layers 70 are patterned so as to diverge (go far from one another) as they extend from the input electrode 6A to the signal supply terminal 70B. As mentioned previously, the interval of the wiring layers 70 is inclined to become narrower as screen size of the liquid crystal display device increases.

The input electrodes 6A of the drain driver IC 6 are divided into groups with respect to the functions thereof, and arranged in such groups. For example, five groups including a logic input section, a reference power supply input section, a power supply input section, a reference power supply input section, and a logic input section are arranged in this order from the right side of FIG. 1. The connection terminals to the FPC in FIG. 1 correspond to the respective terminals 70B in FIG. 4 and are used for a connection to a Flexible Printed Circuit board of the drain circuit board 16B in FIG. 2.

Since the drain driver IC 6 thus arranged permits respective wiring layers connected to the input electrodes 6A to be disposed adjacent to one another for every function of the wiring layers, a layout of the wiring layers is facilitated and the complexity of the pattern thereof is reduced. In the case of determining the electrical resistivity of the respective wiring layers around the designated value for every function, a resistance adjustment for each of the wiring layers is facilitated by arranging the wiring layers for the same use adjacent to each other.

Figure 1:
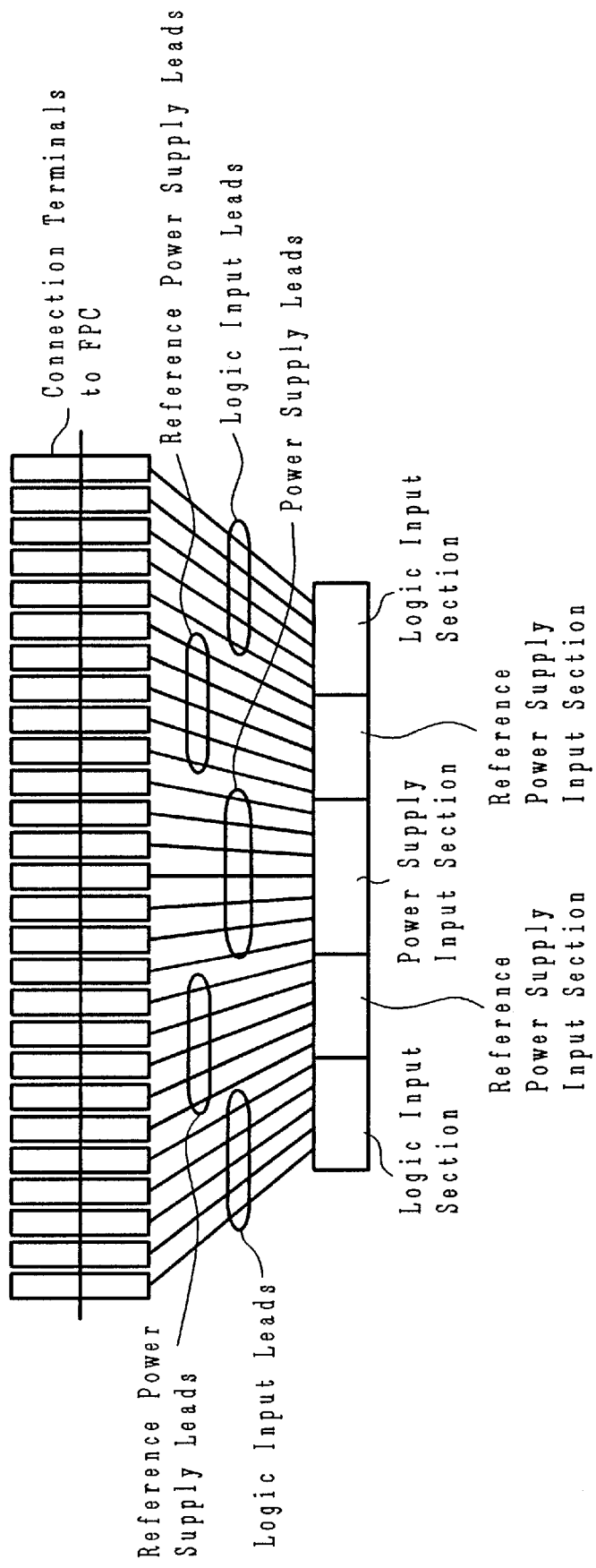
FIG. 1 is a schematic diagram illustrating a wiring pattern related to the drain driver circuitry formed on the periphery of the matrix substrate of a liquid crystal display device according to the present invention.

As shown in FIG. 1, the wiring layers 70 connected respectively to the input electrodes of the drain driver IC 6 are divided into groups with respect to the functions thereof, and are arranged in such groups as logic input leads, reference power supply input leads, power supply input leads, reference power supply input leads, and logic input leads in this order from the right side of FIG. 1.

In this embodiment, logic input leads are formed so as to substantially unify the resistance values of the wiring layers belonging thereto, reference power supply leads are formed so as to substantially unify the resistance values of the wiring layers belonging thereto, and power supply leads are formed so as to substantially unify the resistance values of the wiring layers belonging thereto.

For reducing resistance deviations among the wiring layers 70 of each group, the wiring layers of the logic input leads are divided into two subgroups. FIG. 4 shows one of the subgroups at the left side in FIG. 1. As shown in FIG. 4, the wiring layers 70 are distributed for each group of "Logic" (logic input leads), "Ref " (reference power supply input leads), and "Power" (power supply input leads) by predetermined numbers from the right to the left. The line widths of the wiring layers of the Logic group are designed to become gradually narrower from the right side (end part of the wiring region) to the left side (middle part of a wiring region). The term "wiring region" refers to a region provided on the transparent substrate for arranging the aforementioned wiring layers (formed of conductive materials like metal, alloy, conductive oxide, or combination thereof). FIG. 4 illustrates a part of the wiring region with respect to the drain driver IC 6. The terminals 70A designated as "Logic" are disposed in the Logic Input Section in FIG. 1 and connect to the input electrodes 6A of the drain driver IC 6 for receiving logic signals. The terminals 70A designated as "Ref." are disposed in the Reference Power Supply Input Section in FIG. 1 and connect to the input electrodes 6A of the drain driver IC 6 for receiving reference voltage signals or a reference voltage. The terminals 70A designated as "Power" are disposed in the Power Supply Input Section in FIG. 1 and connect to the input electrodes 6A of the drain driver IC 6 for receiving electrical power for operating the drain driver IC.

As apparent from FIG. 4, respective logic input leads (the wiring layer 70) are arranged with a radial divergence between the drain driver IC 6 and the signal supply terminals 70B so that the lengths thereof become shorter from the right to the left side in the drawing. Each of the wiring layers 70 of the logic input leads has a first portion extending straightforward toward the signal supply terminals 70B, and a second portion extending in a transverse direction to the first portion. The aforementioned resistance adjustments of the respective wiring layer of the logic input leads may be performed by altering the line width of at least one of the first portion and the second portion, and one of the portions may be removed according to a layout of the wiring region. For purposes of resistance adjustments of the wiring layer of the aforementioned groups, the wiring layers of the logic input leads should be disposed preferably in an area in the wiring region which is further out with respect to the drain driver IC (corresponding thereto) than those of the power supply input leads (corresponding to the drain driver IC).

By forming the respective wiring layer of the logic input leads so that they become gradually narrower in line width from the right to the left side (towards a middle part of the wiring region with respect to the drain driver IC 6) in FIG.

4, the resistance values of the wiring layers become uniform in the aforementioned arrangement.

It should be noted that "unifying resistivity of the wiring layers" does not necessarily refer to adjusting the resistance values thereof identically to a predetermined value, but refers to permitting deviations in a certain range due to an allowable error (as "substantially uniform"). The deviation of the electrical resistance of the wiring layers is permitted within a factor of 20% around an average thereof in accordance with an operational margin of the drain driver IC, however it is adjusted within a factor of 10% around the average for considering an external circuit as the control IC, power supply circuit, or the like.

A group of the reference power supply leads comprises a predetermined number of the wiring layers adjacent to a group of the other wiring layers utilized for the logic input leads, and the respective wiring layers utilized for the reference power supply leads are formed to become gradually narrower in line width from the right to the left side in FIG. 4.

As in the layout of the wiring layers of the logic input leads, the wiring layers of the reference power supply leads are also arranged with a radial divergence pattern between the drain driver IC 6 and the signal supply terminals 70B so that the lengths thereof get shorter from the right to the left side (towards a middle part of the wiring region with respect to the drain driver IC 6), as seen in the drawing.

Forming the respective wiring layers of the reference power supply leads so that they become gradually narrower in line width from the right to the left side (towards a middle part of the wiring region with respect to the drain driver IC 6) in FIG. 4, the resistance values of the wiring layers become uniform as thus arranged. The electrical resistance adjustments for the reference power supply leads may be performed after those for the logic input leads.

The resistivity unified among the wiring lines of the respective reference power supply leads need not be identical the resistivity unified among the other wiring lines of the logic input leads.

The basis for permitting a difference between the unified resistance of the logic input leads and the unified resistance of the reference power supply leads is that any possible deviation in waveform delay of the logic signals or the like can be avoided by substantially unifying the logic input lead resistance, and the reference voltages can be supplied through the respective reference power supply leads without fluctuations or deviations by substantially unifying the reference power supply lead resistance.

Further, in this embodiment, the differences among the lengths, of the wiring layers (lead lengths) utilized for the power supply leads are negligible in contrast with those of the logic input leads or the reference power supply leads, because the input electrodes 6A of the power supply input section at the drain driver IC 6 are designed to be located in a middle part (almost central part) of the drain driver IC as shown in FIG. 1.

These respective power supply leads are arranged such that the four wiring layers 70 thereof are integrated into another wiring layer spreading in a direction transverse to the directions of extension of the four wiring layers 70, in the vicinity of the terminals 70A. Thus, the other wiring layer is formed as a conductive layer having a fairly broad width.

Using such an arrangement, any possible voltage drop of the power supply voltage fed through the power supply leads is suppressed so that the operating voltage range of the drain driver IC 6 is kept as large as possible.

It is apparent from the foregoing explanation that the a structure of this embodiment substantially unifies the electrical resistance of the wiring layers connected to the logic signal input electrodes mutually even when the inherent resistance thereof is high in value, and substantially unifies the electrical resistance of the wiring layers connected to the reference power supply electrodes mutually even when the inherent resistance thereof is high in value.

By substantially unifying the electrical resistance of the wiring layers connected to the logic signal input electrodes of the drain driver IC (the image signal driver), the deviation in the waveform delay of the signals transmitted therethrough is prevented from appearing, and thus the operation of the image signal driver circuitry can be well stabilized.

By substantially unifying the electrical resistance of the wiring layers connected to the reference power supply electrodes of the drain driver IC, possible deviations in the voltage potential drop of the reference voltage (or the reference voltage signals) supplied thereby can be suppressed sufficiently.

Even if the wiring layers are formed densely at the input-side of the image signal driver circuitry, similar advantages to those described above are attainable only by substantially unifying the electrical resistance of the wiring layers through which the same kind of signals are transmitted, mutually.

The wiring layers connected to the logic signal input electrodes are arranged mutually close to one another, and those connected to the reference power supply electrodes are arranged mutually close to one another. Thus, the resistance adjustments for unifying the wiring layers disposed adjacent to one another are fairly simplified.

In the embodiment described above, the resistivity of the respective wiring layers is unified through adjustments of the line widths thereof However, the present invention should not exclusively be limited thereto. For example, the objects of the present invention also may be achieved by stacking another conductive layer or additional conductive layers on or under the conductive layer mentioned previously as the wiring layer. The wiring layer thus formed has a multilayer structure. Adjusting the length of the stacking structure of the wiring layer by limiting the length of another conductive layer, or additional conductive layers, the electric resistance of the wiring layer can be settled at a preferable value. Thus, another conductive layer or additional conductive layers are formed partially on or under the wiring layer, and the length of the stroking structure may be altered with respect to the wiring layers belonging to the same group. For example, an ITO (Indium-Tin-Oxide) film contacting the wiring layer in a opening of an insulating film disposed between the wiring layer and the ITO film can be used for another conductive layer. The ITO film thus arranged is used for protecting the wiring layer, formed of a metal or an alloy, in a stacking structure thereof In this case, the length of the stacking structure may be adjusted according to the size of the aforementioned opening.

The embodiment mentioned above is designed to substantially unify the logic signal input lead resistance and to substantially unify the reference power supply lead resistance. As the logic signal input leads are disposed rather at the periphery (the right and left sides in FIG. 1) of the drain driver IC 6, differences among the line lengths thereof must become large in comparison with those of the reference power supply leads.

In this case, significant advantages appear merely by substantially unifying the logic signal input lead resistance.

Further, in this embodiment, the drain drive ICs 6 need not employ such an arrangement of the logic input sections, the reference power supply input sections, and the power supply input section as shown in FIG. 1, and may be modified relative to the other arrangements of these sections.

Furthermore, the foregoing explanation of the preferred embodiment is directed to an example of a liquid crystal display device of the so-called the lateral electric field type. However, the present invention should not exclusively be limited to liquid crystal display devices as this type.

It is apparent from the foregoing description that the liquid crystal display device according to the present invention enables a stable operation of an image signal drive circuitry thereof.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. A liquid crystal display device comprising:
    a pair of substrates between which a liquid crystal layer is sealed;
    a plurality of switching elements provided on one of the pair of substrates;
    a plurality of image signal driver circuits juxtaposed along an edge of the one of the pair of substrates and outputting image signals to the plurality of switching elements;
    a printed circuit board having a plurality of output portions including a plurality of wiring layers electrically connected to input electrodes of one of the plurality of image signal driver circuits through a plurality of terminals juxtaposed on the edge of the one of the pair of the substrates; and
    a plurality of leads being formed on the edge of the one of the pair of the substrates, respective ones of the p plurality of leads connecting one of the plurality of terminals to one of the input electrodes;
    wherein the plurality of terminals are divided into at least first, second and third groups arranged in this order along the edge of the one of the pair of the substrates, each of the first, second and third groups including at least two of the plurality of terminals, the terminals belonging to at least one of the first group and the third group supplying input logic signals from the printed circuit board to the one of the plurality of image signal driver circuits, and the terminals belonging to the second group supplying electricity from the printed circuit board to the one of the plurality of image signal driver circuits; and
    wherein the plurality of leads are divided into a first logic input group connected to the terminals belonging to the first group, a power supply input group connected to the terminals belonging to the second group, and a second logic input group connected to the terminals belonging to the third group, the leads of the power supply input group being located at a middle area with respect to the one of the plurality of image signal driver circuits.

2. A liquid crystal display device according to claims 1, wherein the leads of the first logic input group are located at one side of the middle area with respect to the one of the plurality of image signal driver circuits, and the leads of the second logic input group are located at another side of the middle area with respect to the one of the plurality of image signal driver circuits.

3. A liquid crystal display device according to claim 1, wherein the leads belonging to at least one of the first logic input group and the second logic input group are arranged with a radial divergence with respect to the middle area from the one of the plurality of image signal driver circuits towards the plurality of terminals.

4. A liquid crystal display device according to claim 1, wherein lead widths of the plurality of leads belonging to at least one of the first logic input group and the second logic input group gradually narrow in a direction toward the middle area.

5. A liquid crystal display device according to claim 1, wherein the plurality of terminals belonging to the second group are further divided into fourth, fifth and sixth subgroups arranged in this order along the edge of the one of the pair of the substrates, each of the fourth, fifth and sixth subgroups including at least two of the terminals belonging to the second group, the terminals belonging to at least one of the fourth subgroup and the sixth subgroup inputting a reference voltage from the printed circuit board to the one of the plurality of image signal driver circuits, and the terminals belonging to the fifth subgroup supplying electric power from the printed circuit board to the one of the plurality of image signal driver circuits.

6. A liquid crystal display device according to claim 1, wherein the printed circuit board is divided into two boards along the edge of the one of the pair of the substrates.

7. A liquid crystal display device comprising:
    a pair of substrates between which a liquid crystal layer is sealed;
    a plurality of switching elements provided on a surface of one of the pair of substrates facing another of the pair of substrates;
    an image signal driver circuit provided in a periphery of the surface of the one of the pair of substrates and outputting image signals to the plurality of switching elements;
    a plurality of wiring layers formed in the periphery of the surface of the one of the pair of the substrates to be extended from the image signal driver circuit to the edge of the surface of the one of the pair of the substrates, and each of the wiring layers connects to one of the input electrodes of the image signal driver circuit electrically at an end thereof and has a terminal at another end thereof;
    wherein the plurality of wiring layers are juxtaposed on the edge of the one of the pair of the substrates and divided into at least a first logic input group, a power supply input group, and a second logic input group in this order along the edge of the one of the pair of substrates, each of the first logic input group, the power supply input group and the second logic input group has at least two of the plurality of wiring layers, each of the wiring layers belonging to at least one of the first logic input group and the second logic input group serving as an input logic lead receiving logic signals at the terminal corresponding thereto for input to the image signal driver circuit, and each of the wiring layers belonging to the power supply input group serving as a power supply lead receiving electricity at the terminal corresponding thereto for input to the image signal driver circuit.

8. The liquid crystal display device according to claim 7, wherein the wiring layers belonging to at least one of the first logic input group and the second logic input group are arranged with a radial divergence with respect to the wiring layers belonging to the power supply input group towards the edge of the one of the pair of the substrates.

9. A liquid crystal display device according to claim 7, wherein the wiring layers belonging to the power supply input group are further divided into first, second and third subgroups arranged in this order along the edge of the surface of the one of the pair of substrates, each of the first, second and third subgroups including at least two of the wiring layers belonging to the power supply input group, each of the wiring layers belonging to at least one of the first subgroup and the third subgroup serving as a reference voltage supply lead for the image signal driver circuit, and each of the wiring layers belonging to the second subgroup serving as a power supply lead for the plurality of image signal driver circuit.

* * * * *